US010079778B2

(12) United States Patent
Beers et al.

(10) Patent No.: US 10,079,778 B2
(45) Date of Patent: *Sep. 18, 2018

(54) CUSTOMER CONTROLLED VIDEO NETWORK

(71) Applicant: The Switch Enterprises, LLC, Osterville, MA (US)

(72) Inventors: Scott Beers, Hobe Sound, FL (US); David Anderson, Los Alamitos, CA (US); Bruce Anderson, Houston, TX (US); Howard Miller, North Easton, MA (US)

(73) Assignee: The Switch Enterprises, LLC, Osterville, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/055,235

(22) Filed: Feb. 26, 2016

(65) Prior Publication Data

US 2016/0205043 A1 Jul. 14, 2016

Related U.S. Application Data

(63) Continuation of application No. 13/773,448, filed on Feb. 21, 2013, now Pat. No. 9,306,873.

(51) Int. Cl.
*H04L 12/28* (2006.01)
*H04L 12/931* (2013.01)
*H04L 12/937* (2013.01)
*H04N 21/647* (2011.01)
*H04L 29/08* (2006.01)

(52) U.S. Cl.
CPC .......... *H04L 49/205* (2013.01); *H04L 49/254* (2013.01); *H04L 67/32* (2013.01); *H04N 21/647* (2013.01); *H04N 21/64707* (2013.01); *H04N 21/64738* (2013.01)

(58) Field of Classification Search
CPC .................................................. H04L 49/205
See application file for complete search history.

(56) References Cited

U.S. PATENT DOCUMENTS

| 6,411,623 B1* | 6/2002 | DeGollado | H04L 12/2697 348/E17.003 |
| 2002/0064148 A1 | 5/2002 | Hall | |
| 2004/0264372 A1* | 12/2004 | Huang | H04L 45/00 370/230 |
| 2006/0020694 A1 | 1/2006 | Nag | |

(Continued)

*Primary Examiner* — Gerald A Smarth
(74) *Attorney, Agent, or Firm* — Wolf, Greenfield & Sacks, P.C.

(57) ABSTRACT

A technique for allowing customers to control a video network. A network controller receives a request from an end user for a video connection between a first port and a second port. The request may specify at least a start time, an end time, the first port and the second port. A plurality of available routes between the first port and the second port may be analyzed to determine at least one selected route that will be used to connect the first port and the second port. A first command may be sent to automatically connect the first port and the second port via the at least one selected route at the start time. While in progress, the video connection may be modified according to system availability. Customers may have a view of all requests that have been made, completed or reserved for in the future.

30 Claims, 10 Drawing Sheets

(56) References Cited

U.S. PATENT DOCUMENTS

| | | | |
|---|---|---|---|
| 2007/0142050 A1* | 6/2007 | Handforth | H04W 36/32 455/436 |
| 2007/0288623 A1 | 12/2007 | Kato et al. | |
| 2008/0049621 A1 | 2/2008 | McGuire et al. | |
| 2008/0049640 A1 | 2/2008 | Heinz | |
| 2010/0091648 A1* | 4/2010 | Zhao | H04L 12/1877 370/225 |
| 2013/0294228 A1 | 11/2013 | Ahuja et al. | |

* cited by examiner

CUSTOMER CONTROLLED VIDEO NETWORK

CROSS REFERENCE TO RELATED APPLICATIONS

The present application claims the benefit under 35 U.S.C. § 120 as a continuation application of U.S. patent application Ser. No. 13/773,448, filed Feb. 21, 2013, the entire contents of which is incorporated herein by reference.

TECHNICAL FIELD

The present invention relates to a video network, wherein connections between ports may be controlled by customers of a video network service provider.

BACKGROUND

Video network service providers are used both locally (e.g., within a single city) and nationally (e.g., between cities) to transmit high quality video data. Various communities may desire to transmit video data from one place to another. Such community members may include the television industry, the film industry, news bureaus, the music industry, the sports industry, governments, universities, and any other industry that uses high quality video data. For example, a television network may wish to send an uncompressed high-definition video feed of a live event, such as a live sports event or an awards show (such as the Oscars or the Grammys) from a first venue location where the event is occurring to a second location where the television network's production center is located. This video data may be transmitted over a video network from a port located in the venue where the event is occurring to a port in a television production center in a different state. The television network production center may manipulate and control the video data by, for example, inserting advertisements, and further distribute the integrated video data to affiliates in local markets throughout the country.

In the past, video networks were controlled by a video network service provider that provided the physical infrastructure to customers that had access to video ports connected to the video network. In these legacy systems, creating a video connection often required a phone call to the video network service provider to create a manual connection between a source port and a destination port. A second phone call to the video network service provider was also required to terminate the video connection between the two ports.

BRIEF SUMMARY

Described herein are techniques for giving customers of a video network service provider control over the video network.

Some embodiments are directed to a computer-controlled method for controlling a video network. The method may be comprised of receiving a request from an end user for a video connection between a first port and a second port, wherein the request specifies at least a start time, an end time, the first port and the second port and the quality of service (e.g., the amount of bandwidth) desired; analyzing, using at least one processor, a plurality of available routes between the first port and the second port to determine at least one selected route that will be used to connect the first port and the second port; and automatically sending, to at least one switch controller, a first command to connect the first port and the second port via the at least one selected route at the start time. In some embodiments, the method may also include sending, to the at least one switch controller, a second command to disconnect the first port and the second port via the at least one selected route at the end time. Other embodiments may include receiving a goodnight command from the end user at a time before the end time; and in response to the goodnight command, sending, to the at least one switch controller, a second command to disconnect the first port and the second port at the time before the end time.

In some embodiments, the at least one selected route comprises a primary route and an additional route, which may be used as a secondary route. The first port may in a first city and the second port may be in a second city, other than the first city. Some embodiments include a request that specifies that the first port is a source port and the second port is a destination port. In some embodiments, the end user is an owner of the destination port and access to the source port may be explicitly granted by an owner of the source port.

In certain embodiments, analyzing the plurality of available routes between the first port and the second port may include determining the at least one selected route based on the number of network city hops/nodes between the first port and the second port for each of the plurality of available routes. Analyzing the plurality of available routes between the first port and the second port may alternatively, or in addition, include determining the at least one selected route based on the available bandwidth between the first port and the second port for each of the plurality of available routes. The available bandwidth for each of the plurality of available routes may be determined based on the total bandwidth of each segment of the respective available route; and the used bandwidth of each segment of the respective available route, wherein the used bandwidth is the amount of bandwidth scheduled to be used by other video connections between the start time and the end time. Analyzing the plurality of available routes between the first port and the second port may alternatively, or in addition, include determining the at least one selected route based on information indicating that one or more segments of the plurality of available routes is unavailable. Some embodiments may receive the information indicating that one or more segments of the plurality of available routes is unavailable. Analyzing the plurality of available routes between the first port and the second port may alternatively, or in addition, include determining the at least one selected route based on port information about at least one intermediate port of the plurality of available routes. The port information may include the number of available ports on at least one switch of a corresponding route and/or the capabilities of ports on at least one switch of a corresponding route.

Some embodiments are directed to at least one non-transitory computer readable medium encoded with computer executable instruction that, when executed by a computer, perform the aforementioned method.

Some embodiments are directed to a video network controller. The controller may include: a storage device configured to store a catalog of routes and a schedule for connections between ports; a network interface configured to receive a request from an end user for a video connection between a first port and a second port, wherein the request specifies at least a start time, an end time, the first port and the second port; a route manager configured to analyze a plurality of available routes between the first port and the second port to determine at least one selected route that will be used to connect the first port and the second port; and at least one switch controller interface configured to send, to at least one switch controller, a first command to connect the first port and the second port via the at least one selected route at the start time.

In some embodiments, the at least one switch controller interface may be further configured to send, to the at least one switch controller, a second command to disconnect the first port and the second port via the at least one selected route at the end time. In other embodiments, the network interface may be further configured to receive a goodnight command from the end user at a time before the end time; and the at least one controller interface may be further configured to, in response to the goodnight command, send, to the at least one switch controller, a second command to disconnect the first port and the second port at the time before the end time.

In some embodiments, the at least one selected route comprises a primary route and a secondary route. The first port may be in a first city and the second port is in a second city other than the first city. The request may specify that the first port is a source port and the second port is a destination port. In some embodiments, the user is an owner of the destination port; and access to the source port was explicitly granted by an owner of the source port.

In some embodiments, the video network controller further comprises a storage device configured to store route information for each of the plurality of available routes between the first port and the second port, wherein the route information comprises a number of city network hops between the first port and the second port for the corresponding route; and the route manager is further configured to determine the at least one selected route based on the route information. Alternatively, or in addition, the video network controller may further include a storage device configured to store route information for each of the plurality of available routes between the first port and the second port, wherein the route information comprises an available bandwidth between the first port and the second port for the corresponding route; and the route manager may be further configured to determine the at least one selected route based on the route information. In some embodiments, the route manager may be further configured to determine the available bandwidth for each of the plurality of available routes based on the total bandwidth of each segment of the respective available route and the used bandwidth of each segment of the respective available route, wherein the used bandwidth is the amount of bandwidth scheduled to be used by other video connections between the start time and the end time. Alternatively, or in addition, the video network controller may further comprise a storage device configured to store status information comprising at least one indication that one or more segments of the plurality of available routes is unavailable; and the route manager may be further configured to determine the at least one selected route based on the status information. In some embodiments, the at least one switch controller interface is further configured to receive the status information from at least one switch controller. Alternatively, or in addition, the video network controller may include a storage device configured to store port information about at least one intermediate port of the plurality of available routes; and the route manager may be further configured to determine the at least one selected route based on the port information. In some embodiments, the port information may include the number of available ports on at least one switch of a corresponding route and/or the capabilities of ports on at least one switch of a corresponding route.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
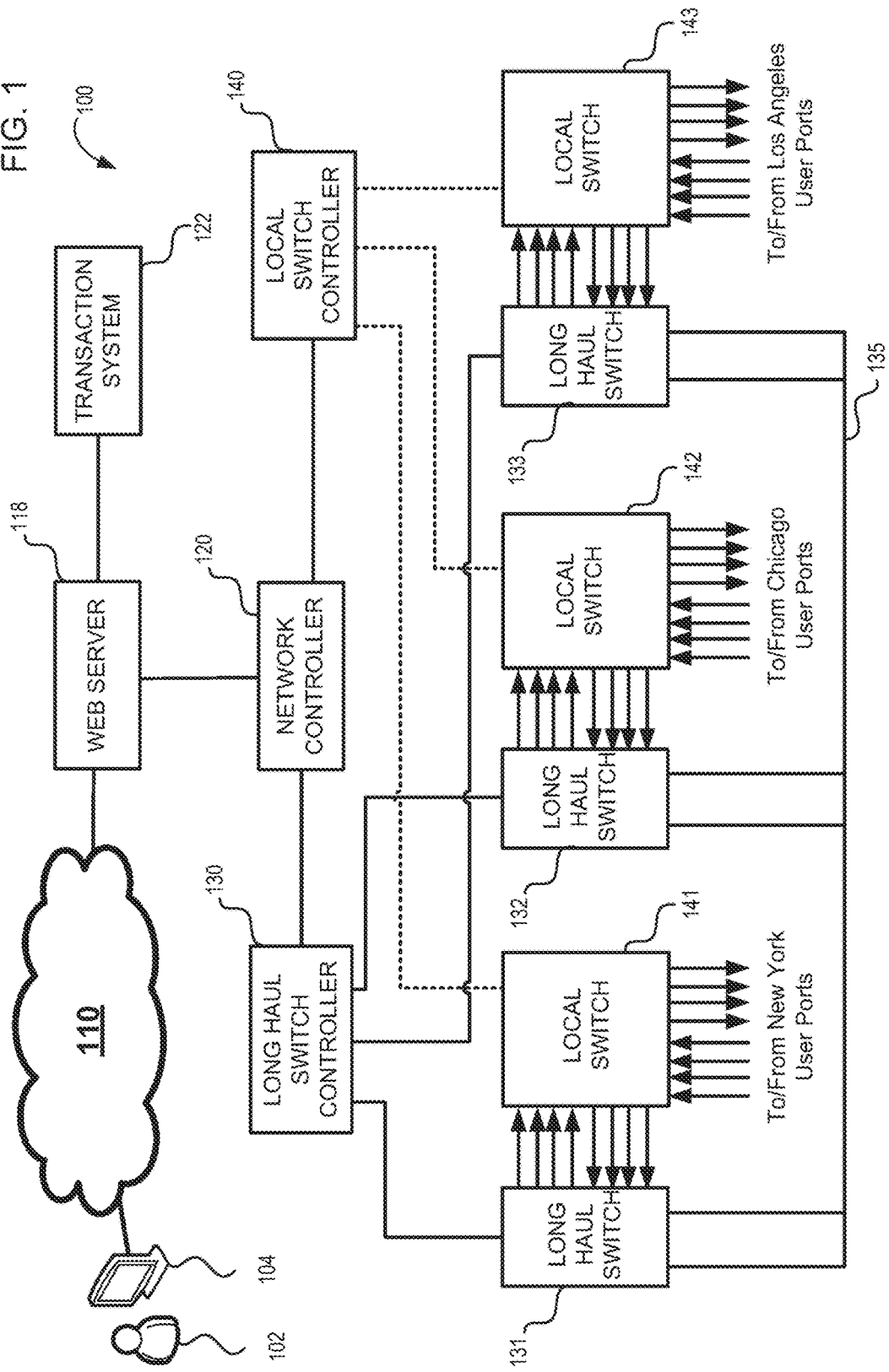
FIG. 1 is a simplified block diagram of an exemplary video network environment according to some embodiments.

The inventors have recognized and appreciated the control of video network connections in a video network environment is traditionally slow and un-optimized for the best performance. Placing phone calls to create video connections between ports can take upwards of ten minutes. Moreover, the humans that create the connection may do so in a suboptimal way. For example, the video network service provider employee that creates the network may not take all the pertinent considerations into account when choosing a route for the video connection.

Moreover, the inventors have recognized and appreciated that forming video connections between ports of the video network may be unpredictable and unreliable. For example, using traditional systems, it was not possible to easily reserve one or more routes for a video connection and guarantee that the route would be available at the reserved time. Moreover, terminating video connections required further phone calls with the video network service provider that required additional time and human resources.

The inventors have recognized and appreciated that allowing customers of a video network service provider to directly control the video network would result in greater efficiency and better control of the video network. Moreover, by allowing the customers to interact with a video controller of the video network, the customer can determine precisely the type of service they want and get a price quote for the service without having to interact via telephone with an employee of the video network service provider. This may allow customers to have more certainty in their scheduling of video connections. For example, in traditional systems, scheduling video connections in advance either not possible or cumbersome. By automating the scheduling of the video connection and providing the control of the schedule to the consumer, the video network becomes simpler to use and more reliable for the customer.

The inventors have also recognized and appreciated that allowing customers to explicitly control access to the content produced by the customer may both increase security/privacy and increase the potential for content that to be distributed properly. For example, in traditional video network environments, an end user would call the video network service provider to request access to a particular video feed. In many cases, it would be assumed that if an end user was requesting said feed, that that end user had permission to use the feed. However, the creator of the video feed may not have given permission for the end user to use the video feed, resulting in an unauthorized access of the customers content. Such unauthorized access may be prevented by providing end users with the ability to grant specific permissions for which end users are allowed to access which ports.

Some embodiments are directed to a customer-driven, web-based, transactional video order and delivery system and method. End users, on behalf of a customer of a video network service provider, may inquire about the price for a video connection, place a request for a video connection, modify video connection reservations and receive automatic bills for the video connection. In some embodiments, video connections between ports may be made on-demand or scheduled in advance. In some embodiments, in-use video connections may be terminated by an end user prior to a scheduled end-time without being billed for the unused, reserved time. End users may also monitor and manage upcoming video connection reservations via a status screen of a graphical user interface. This Status Screen may provide the customer with a view of some or all parameters that comprises what is on the air (e.g., current video connections), what is up coming within the next 24 hours, what is coming up from 24 hours out to 6 months and what has completed in the last 24 hours. In some embodiments, the parameters may be sortable. From the Status Screen customers may have access to the order that allows them to modify or cancel the order. An end user may extend an order by opening the order and placing a new "end time". From the Status Screen customers may end a feed by clicking an icon. At the Status Screen the customers may also get blinking warning, or any other suitable visual warning, within 5 minutes of a video connection coming on the air. In some embodiments, there may also be a blinking warning 5 minutes prior to the conclusion of the service to warn the customer in case their feed has not completed and they want to extend the current order or any order that is present on the Status Screen. For each individual customer that customer only sees their activity. In a Network Operations Center of the video network service provider, all customer activity may be viewed and monitored.

FIG. 1 illustrates a video network environment 100 according to some embodiments. An end user 102 interacts with a video network user interface implemented by an end user computing device 104. The end user 102 may also be referred to as a customer of the video network service provider. The end user 102 may be the owner and/or operator of at least one port that may transmit and/or receive video data. For example, the end user 102 may be an employee of a television network. The end user computing device 104 may be any suitable computing device capable of implementing the user interface. For example, the end user computing device 104 could be a desktop computer, a laptop, a tablet, or a smartphone. In some embodiments, end user computing device 104 may include a touch screen. The end user computing device 104 may be provided by a video network provider or the end user may use existing hardware to implement the video network user interface using software provided by the video network provider.

In some embodiments, there may be more than one user 102 associated with a customer of the video network service provider. For example, if the customer is a cable news television network, there may be many individuals within the network that may need to create video connections. Accordingly, in some embodiments, there may one or more super users that are given the ability to create and delete users associated with the customer. In some embodiments, each user may have a unique set of permissions for creating video connections. For example, a user may be given permission to access only a subset of the total number of ports owned by the customer. Alternatively, or in addition, users may not be given permission to create inter-city video connections, but may be given permission to create local video connections. This is useful in embodiments where the video network service provider bills the customer a flat monthly fee for local connections, but a by-the-minute fee for inter-city connections. In some embodiments, users, such as the super users, may be given full permission to access any port owned by the customer cable news television network and make any available video connection.

In some embodiments, the computing device 104 presents a graphical user interface (GUI) to the end user 102. The GUI may be a simple interface with basic options that allow the end user 102 to easily interact with the system to create a video connection without having to know the details of the video network and the available routes. For example, the GUI may present options such as: source city, source port, destination city, destination port, start time, end time, and a quality of service. This list of options is neither exhaustive nor limiting and is presented by way of example. Other options may also be provided, such as an option to search for a destination port by the identity of the owner of the port. For example, a user may search for all the ports owned by a particular television network.

In some embodiments, the GUI may also be used to display scheduling information to the end user 102. For example, reservations for when an end user port is scheduled to be used may be displayed to the end user 102. This may facilitate the scheduling of a video connection because it allows the end user 102 to see when each port is available for use. In some embodiments, the displayed port scheduling information may also allow the end user 102 to manage all scheduled video connections for the ports owned by the end user 102. For example, if the end user 102 owns a plurality of end user ports, the schedule for all video connections on each of the ports may be displayed. In some embodiments, the GUI may provide the end user with a status of past, present and future video connection and may offer an option to cancel scheduled video connections and/or end currently active video connections. If the end user 102 sees an upcoming scheduled video connection on the GUI that is no longer necessary, the end user 102 may cancel or modify the video connection.

Exemplary GUIs according to some embodiments are described in more detail in, connection with FIG. 8 and FIG. 9, below.

The GUI of computing device 104 may be implemented in any suitable way. For example, a client software program provided by the video network service provider may be executed on the computing device. Alternatively, the GUI may be implemented as a web service such that no special software is required to control the video network. If the GUI is implemented as a web service, the GUI may be presented to the end user 102 via a web browser executed by computing device 104. The web service GUI may communicate over the Internet 100 with a web server 118 using any suitable protocols or languages such as Simple Object Access Protocol (SOAP), Extensible Markup Language (XML), Hypertext Transfer Protocol (HTTP), Simple Mail Transfer Protocol (SMTP), Transmission Control Protocol (TCP), and Internet Protocol (IP). This list is neither exhaustive nor limiting and is provided by way of example.

The end user 102 may use the GUI of the computing device 104 to generate a request for a video connection between two or more ports using the aforementioned options. The request, which may be formatted in an suitable way, as discussed above, may be transmitted from the computing device 104 via the internet 110 to a web server 118. The web server 118 may receive the end user's request for a video connection and determine that the request is destined for network controller 120. The web server 118 may then transmit the request to the network controller 120 in any suitable way. For example, using SOAP and/or XML messages transmitted over a network.

In some embodiments, the web server 118 may implement an "IP whitelist" where, to ensure privacy and security, only computing devices 104 that have pre-registered with the video network service provider may access the GUI to control the video network. Pre-registration may be done by providing the video network service provider with the IP address of the computing device 104. In some embodiments, the IP address of the computing device 104 is linked with one or more particular users such that only a subset of users may use the GUI on the computing device 104. Some embodiments may, alternatively, or in addition to the IP whitelist, require a user to login to the web server 118 using a user name and password.

The web server 118 receives requests from the end user's computing device 104. The information from the end user's request may be used to form a video connection request that is sent to the network controller 120. The web server 118 may also communicate with transaction system 122, which manages customer transactions in the video network environment and performs billing tasks. For example, the transaction system may automatically bill each customer of the video network service provider based on completed video connections. In other embodiments, the transaction system may receive information regarding completed video connections directly from the network controller 120, rather than from web server 118.

FIG. 1 illustrates the web server 118 as separate from the network controller 120. However, in some embodiments, the web server 118 and the network controller 120 may be implemented on the same physical server. Moreover, the web server 118 and the network controller 120 may each be implemented using more than one server in some embodiments. Embodiments are not limited to any particular arrangement of servers.

In some embodiments, the network controller 120 receives video connection requests from the computing device 104 (via web server 118). The network controller 120 may process the information from the video connection request to determine at least one route for the video connection. The information from the video connection request may be used in conjunction with other data, such as route information, port information or status information, to determine the at least one route.

In some embodiments, the network controller 120 tracks scheduling information for each of the end user ports of the video network environment. The network controller may use the information from a video connection request to check the availability of end user ports based on previously scheduled video connections. If the requested end user ports are available, the network controller may store scheduling information for the newly requested video connection so that the ports will be labeled as reserved when future requests are made.

In some embodiments, the network controller 120 may also receive cancellation requests for already scheduled video connections. When a cancellation request is received, the scheduling information for the end user ports associated with the canceled video connection may be removed so that the ports will be available for further video connection requests.

In some embodiments, the network controller may, in response to a video connection request, determine two or more routes to connect a source port and a destination port. For example, a primary route and a secondary route may be determined. The secondary route may act as a back-up route in case the primary route fails. For example, if a power outage causes a portion of the primary route to cease operation, the video connection may still remain active in the back-up secondary route. In other embodiments, more than one back-up routes may be used by the video network. In some embodiments, the video network service provider may charge an additional fee to the customer for the secondary route. In other embodiments, the secondary route may be included in the fee for the primary route. Embodiments are not limited to any particular number of routes.

In some embodiments, the video network may include both long haul switches 131-133 and local switches 141-143. The local switches 141-143 connect a plurality of ports within a limited geographic area, such as within a single city or metropolitan area. The local switch 141, for example, may be used to create a video connection between a first port in New York City and a second port in New York City, without utilizing any of the long haul switches 131-133 to form a route for the video connection. The long haul switches 131-133 may be inter-city switches that connect one city to another. In some embodiments, the long haul switches 131-133 connect the local switches 141-143 together such a video connection may be formed between ports located in different cities. For example, a first port in New York City may connect, through local switch 141, to long haul switch 131, which further connects to long haul switch 132, giving access to local switch 142 in Chicago, which connects to a second port in Chicago. These connections are provided by way of example. There may be any number of "hops" between the first port and the second port. A "hop" is the number of intermediate devices, such as routers and/or switches, that are part of a route between two ports.

Any suitable device may be used for the long haul switches 131-133 and local switches 141-143. Though the term "switch" is used, this term is intended to include the possibility that a router be used. In some embodiments, the communication line 135 that connect the long haul switches comprises fiber optic cable. In this case, the long haul switches 131-133 have ports with fiber optic connectors. In some embodiments, the communication lines that connect the local switches 141-143 to the customer ports comprise coaxial cable. In this case, the local switches have ports with coaxial cable connectors. Embodiments are not limited to the type of switch used.

The long haul switches 131-133 and local switches 141-143 of some embodiments may have varying capabilities. Moreover, different ports of a single switch may have different capabilities. For example, some switches may support: Uncompressed 3G; Uncompressed High Definition 1.485 Gbps, SMPTE 292M-2008; Uncompressed Standard Definition 270 Mbps, PTE 259M-2008; Customer Compressed HD 19.39 ATSC, SMPTE 310M; and/or DVB/ASI. Thus, some ports of a switch may be capable of transmitting and receiving uncompressed video, while other ports may only be able to receive compressed video, such as video signals compressed using the JPEG 2000 standard. These capabilities may be referred to as a quality of service. For example, uncompressed video may be a first quality of service and JPEG 2000 compressed video may be a second quality of service.

In some embodiments, the long haul switches 131-133 may have the ability to encode and decode video data of various formats and quality of service. For example, a long haul switch 131 may receive an uncompressed video signal from a local switch and compress the signal prior to sending the video signal over the long haul portion of the network to reduce long-haul bandwidth requirements.

In some embodiments, there may be more than one local switch in a particular city. For example, in bigger cities, such as New York City, there may be a large number of customers resulting in the need for a plurality of local switches. The plurality of local switches, in some embodiments, are connected to the same long haul switch.

In some embodiments, the long haul switches 131-133 are controlled by a long haul switch controller 130. FIG. 1 illustrates a single long haul switch controller 130, but some embodiments may utilize more than one controller to control the long haul switches 131-133. The long haul switch controller 130 may be connected to the long haul switches 131-133 via a network, such as the Internet. In some embodiments, the long haul switch controller 130 may control which ports of the long haul switch controller will be used to form a route for a video connection and which quality of service should be used. The long haul switch controller may also control which port to/from a local switch will be connected to a long haul port connected to the long haul fiber 135.

In some embodiments, the local switches 141-143 are controlled by a local switch controller 140. FIG. 1 illustrates a single local switch controller 130, but some embodiments may utilize more than one controller to control the local switches 141-143. The local switch controller 140 may be connected to the local switches 141-143 via a network, such as the Internet. In some embodiments, the local switch controller 140 may control which ports of the local switch controller will be used to form a route for a video connection and which quality of service should be used. The local switch controller may also control which port to/from a long haul switch will be connected to end user port.

In some embodiments, both the long haul switch controller 130 and the local switch controller 140 may receive information from each of the long haul switches 131-133 and local switches 141-143, respectively. For example, status information may be provided to the controllers. Status information may include, for example, whether a port is functional and whether a portion of the network is non-functional. For example, if a fiber connection between New York City and Chicago is interrupted, a long haul switch may provide information to the long haul switch controller 130 about the problem. Moreover, the long haul switch controller 130 and the local switch controller 140 may provide status information to the network controller 120 so that the status information may be used when determining video connection routes.

The network controller 120 analyzes the information from the request for a video connection, along with information about the video network environment, such as information about the status of segments of the network and information about the port capabilities, to determine at least one route between the source port and the destination port. The network controller 120 communicates the details of the determined route to the long haul switch controller 130 and/or the local switch controller 140. For example, if a video connection is requested between two ports in the same city, only a local switch is necessary to form a route for the video connection. Accordingly, the network controller may only communicate with the local switch controller 140 to form the video connection. On the other hand, if a video connection is requested between two ports in different cities, both local switches and long haul switches will be used. Accordingly, the network controller may communicate with both the long haul switch controller 130 and the local switch controller 140.

Figure 2:
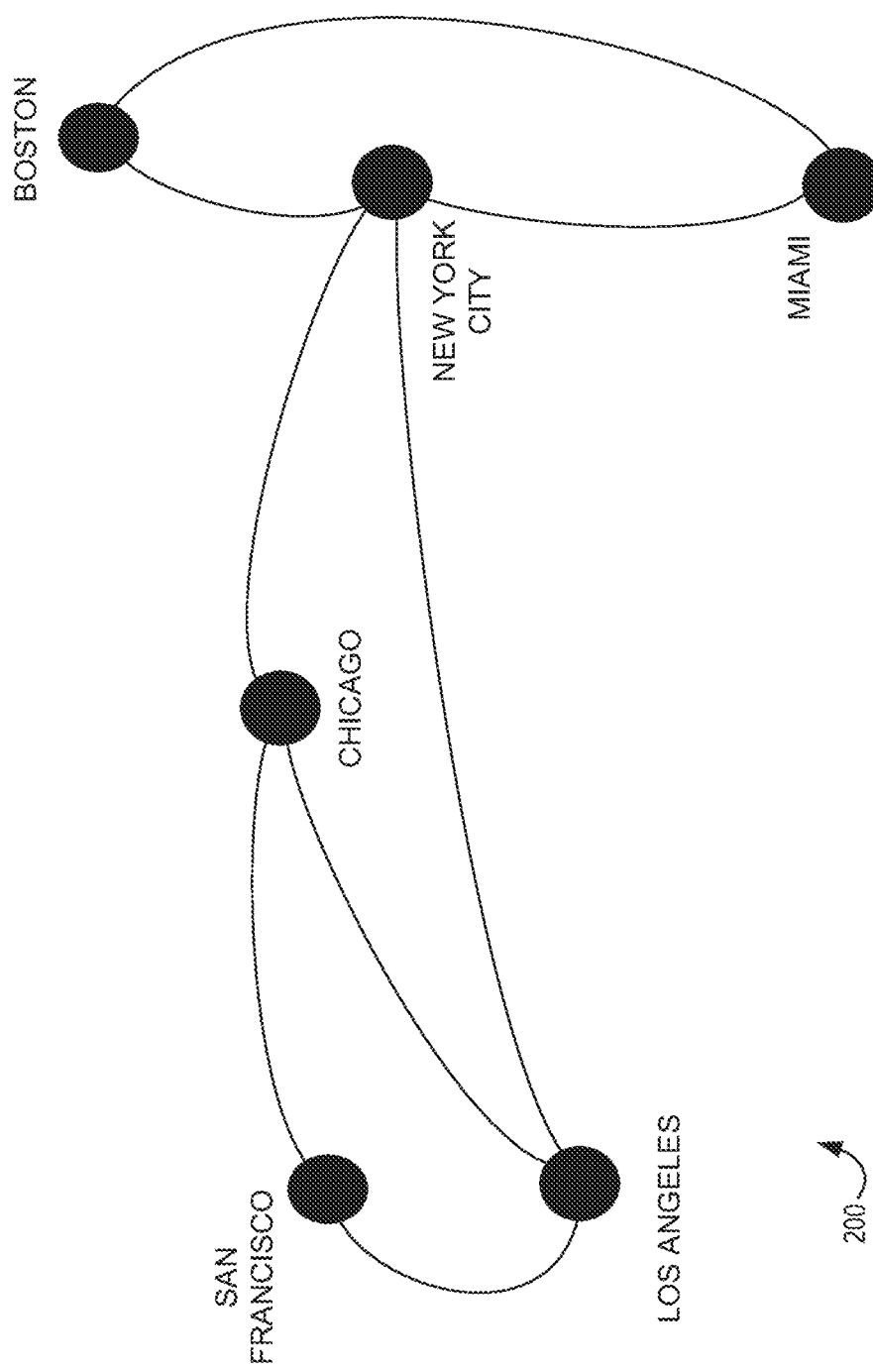
FIG. 2 is a simplified diagram of an exemplary long haul mesh network according to some embodiments.

Each long haul switch 131-133 has at least two long haul ports connected to the long haul fiber 135. The long haul fiber 135 of FIG. 1 is illustrated in simplified form, showing both long haul connection ports connected to the same segment of fiber 135. However, in reality, the long haul network forms a "mesh network" 200, a simplified version of which is shown in FIG. 2. The mesh network 200 is simplified for illustrative purposes to show only six cities in the United States. Embodiments are not so limited. For example, many more cities may be included in the mesh network and cities in multiple countries may also be included.

Every city in mesh network 200 has at least two connections to other cities. For example, Boston is shown with a connection to Miami and a connection to New York City. Other cities, such as New York City, Chicago and Los Angeles have more than two connections to the other cities. Having at least two connections out of each city, connecting each city to at least two other cities, decreases the likelihood that a network malfunction will shut down all video connections to a particular city. For example, if an end user in Boston requests a video connection to a port in Miami, the network controller may determine to use a route based on the direct connection between Boston and Miami. However, if the fiber was inadvertently damaged between Boston and Miami, making the direct connection unavailable, there is still a route from Boston to Miami via New York City. Moreover, in embodiments where a primary and a secondary route for a video connection are determined, having two connections in to and out of every city ensures that a secondary route may be chosen that never uses the same segment of the mesh network as the primary connection. For example, if a video connection is requests between Boston and Los Angeles, the network controller may determine that a primary route for the connection is from Boston to New York City to Los Angeles. When determining a secondary route, the network controller would not select the route from Boston to New York City to Chicago to Los Angeles, because the segment of the route between Boston and New York City is the same in both routes. Nor would the network controller select the route from Boston to Miami to New York City to Los Angeles, because the segment of the route between New York City and Los Angeles is the same in both routes. The network controller may, however, select the route from Boston to Miami to New York City to Chicago to Los Angeles as the secondary route because no segment of that route overlaps with the primary route. The more cities included in the video network, the more options there are for selecting routes. Accordingly, the likelihood of finding independent routes increases as the size of the network grows.

Figure 3:
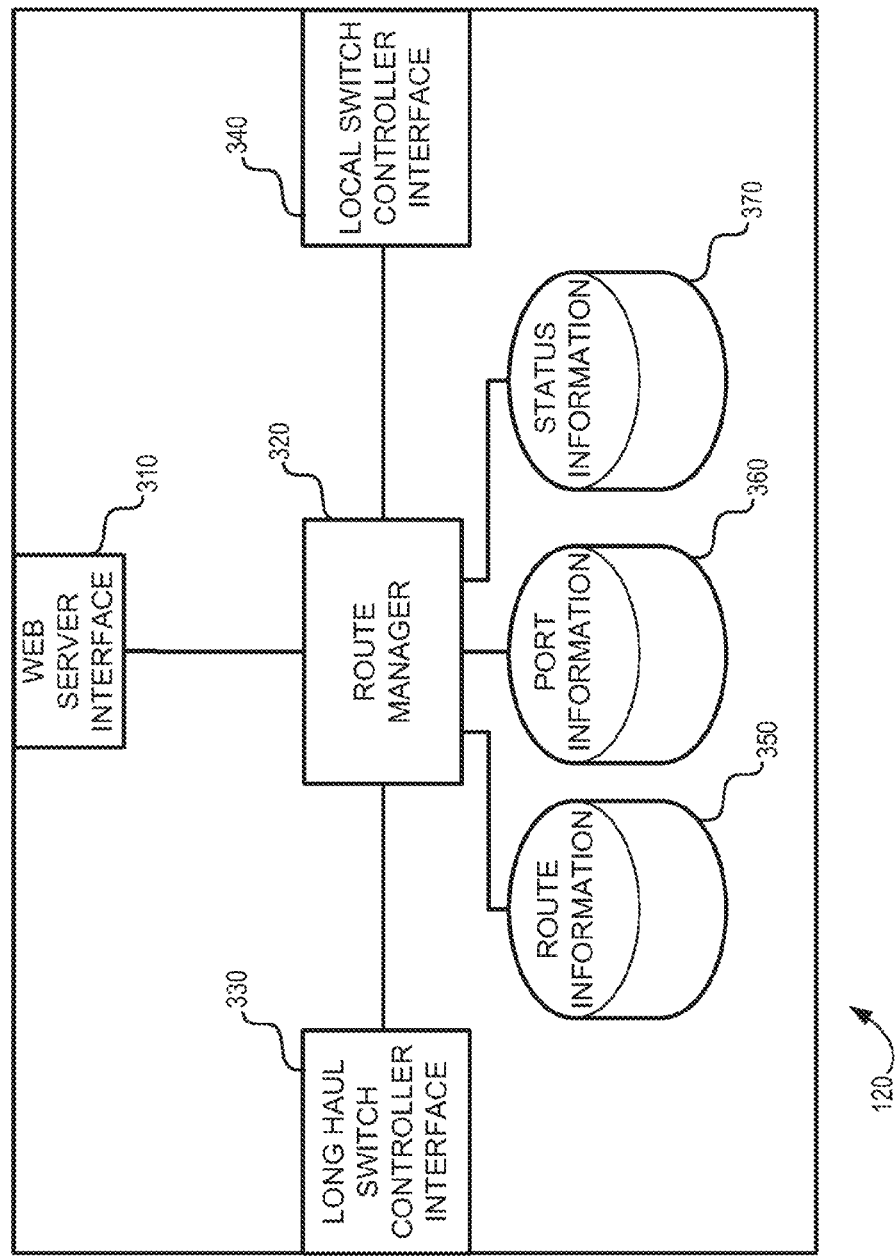
FIG. 3 is a simplified block diagram of a network controller according to some embodiments.

FIG. 3 illustrates the network controller 120 according to some embodiments. The network controller 120 may include a web server interface 310, a long haul switch controller interface 330 and a local switch controller interface 340. FIG. 3 illustrates each of these interfaces as separate interfaces. However, embodiments are not so limited. In some embodiments, a single interface may be used as the web server interface 310, the long haul switch controller interface 330 and the local switch controller interface 340. In some embodiments, the interfaces may be any suitable network interface known in the art.

In some embodiments, the web server interface 310 connects the network controller 120 to the web server 118. The connection may be via a network, such as a local area network (LAN) or the internet. In some embodiments, the web server interface 310 receives a request from the end user's computing device 104 for a video connection via web server 118. The web server interface 310 may provide the request to a route manager 320 for processing. In some embodiments, the web server interface 310 may also transmit messages back to the end user's computing device 104 via the web server 118. For example, if a request for a video connection fails, the end user 102 may be notified that the request failed. Any suitable messages may be sent from the web server interface 310 to the end user's computing device 104. In some embodiments, the web server interface 310 provides messages to the web server 118, which transmits the message to the end user's computing device 118.

The route manager 320 may be implemented by any suitable combination of hardware and/or software. In some embodiments, the route manager 320 receives the request for a video connection from the web server interface 310 and determine whether the requested end user source port and end user destination port is available at the requested time. Scheduling information for the end user ports may be stored in a storage device of the network controller 120. For example, the end user port schedules may be included in the port information 360. In some embodiments, if one or both of the requested end user ports is already reserved at the requested time, the route manager 320 may notify the computing device 104 that the requested video connection is not available. In some embodiments, the route manager 320 may send scheduling information for the requested source and destination port to the computing device 104. The scheduling information may be displayed to the user, via the GUI, in a grid so that the end user 102 may ascertain when each of the ports is available for use. This may allow the end user 102 to reschedule the connection. In some embodiments, the route manager 320 may provide scheduling information to the computing device 104 for other end user ports that are owned by the same owner as the requested end user ports. This information may aid the end user 102 in selecting an alternative end user port to request in a subsequent video connection request.

In some embodiments, the route manager 320 receives the request for a video connection from the web server interface 310 and determines at least one route to form a video connection. The route manager may use various information to determine the at least one route. For example, the network controller may include storage devices for storing route information 350, port information 360 and status information 370, which may be used in determining the at least on route. FIG. 3 illustrates the storage devices 350, 360 and 370 as separate devices within the network controller 120. However, embodiments are not so limited. In some embodiments, all the information may be stored in a single storage device. In other embodiments, the one or more storage device that stored the information used by the route manager 320 may be external to the network controller 120. Any suitable storage device may be used, as described in more detail below. For example, the information may be stored in a database.

In some embodiment, the route information 350 may include a catalog of a plurality of available routes between each city of the mesh network. The catalog may include an order of the network segments that are traversed to form each available route. It may not be possible to store every possible route between two cities, because there may an infinite number of possible routes. In some embodiments, only the possible routes that don't utilize a particular segment of the mesh network more than once are stored. In other embodiments, only possible routes with less than a predetermined number of hops are stored. Embodiments are not limited to any particular type of route information 350. In some embodiment, route information 350 may include the number of hops for each available route. Alternatively, or in addition, the route information 350 may include the total available bandwidth for each segment of each available route.

In some embodiments, port information 360 may include any suitable information about the intermediate ports and end user ports of the network. For example, the port information may include the capabilities of each of the ports. For example, some ports may be able to handle uncompressed video data while other ports may only have the capability of handling uncompressed video data.

In some embodiments, status information 370 may include any suitable information about the status of the network. In some embodiments, status information may include information indicating whether a segment of the network is not operational. For example, if a fiber optic cable of a particular segment of the video network may be damaged, preventing video data from being properly transmitted over said segment. Alternatively, or in addition, status information may include information indicating how much of a segments bandwidth is being used or is reserved for use at a certain time. For example, when if the segment of mesh network 200 between Chicago and Los Angeles is reserved for a certain time and the reserved video connection requires a first amount of bandwidth, information indicating the reserved first amount of bandwidth may be included in the status information 370.

In some embodiments, information from the request itself may be used by the route manager 320 to determine the at least one route. For example, the request may specify a source city, a source port, a destination city, a destination port, a start time, an end time and a quality of service. The request may contain information specifying the aforementioned parameters of the video connection, which may be used by the route manager 320 to determine the at least one route.

The route manager 320 may determine the at least one route in any suitable way. In some embodiments, when a request indicates that an end user wishes to create a video connection between a first port and a second port, the route manager 320 may select the route from the plurality of available routes with the fewest number of hops between the two ports as a primary route. A secondary route may also be selected based on the fewest number of hops. In some embodiments, the secondary route may be further limited by not selecting a route from the plurality of available routes that includes any segment that is in the selected primary route. In this way, the secondary route (or any subsequent back-up route, such as a tertiary route) may be selected based on the route selected for the primary route.

In some embodiments, the at least one route may be determined based on a combination of route information and status information. For example, a route may be selected based on bandwidth availability. The route information may indicate the total bandwidth available on particular segments of the video network; port information may indicate the amount of bandwidth scheduled to be used by other connections at the same time as the requested video connection. Accordingly, routes that do not have sufficient bandwidth to handle the capacity of the requested video connection will not be selected. Similarly, if status information indicates that a particular segment of the video network is not operational, then routes involving the failed segments will not be selected.

In some embodiments, the route manager 320 may use port information to select the at least one route from the plurality of available routes. For example, a route may be selected based on the number of available ports between a long haul switch and a local switch. There are a limited number of physical ports on the switches, meaning there are a limited number of connections that can be made at any given time, even if there is sufficient bandwidth to support more video connections. Accordingly, which port of a switch is used may be determined based on which other ports of said switch are in use at the desired time of the video connection. In some embodiments, the route manager 320 may weight certain ports so that they are less likely to be used and are therefore used only after other ports are reserved by other connections. For example, ports only capable of handling compressed video data (e.g., JPEG 2000 compression) may be weighted such that they are less likely to be selected than ports capable of handling uncompressed high definition video data.

Embodiments are not limited to any particular manner of selecting the at least one route. In some embodiments, any combination of route information 350, port information 360 and status information 370 may be used by the route manager 320 to select the at least one route.

In response to determining the at least one route, the route manager 320 transmits information to the long haul switch controller 130 and the local switch controller 140 via the long haul switch controller interface 330 and the local switch controller interface 340, respectively, indicating the routes that need to be established to create the requested video connection.

In some embodiments, the long haul switch controller interface 330 communicates with the long haul switch controller 130 over a network, such as the Internet. Information indicating the segments of the long haul network that will be used to establish the requested video connection are transmitted to the long haul switch controller 130. The long haul switch controller interface 330 may receive information back from the long haul switch controller 130. For example, information about faults in the long haul network may be communicated to the network controller 120. The long haul switch controller interface 330 may receive this information, and provide the information to the router manager 320, which may store the information as part of the status information 370 in a storage device.

In some embodiments, the local switch controller interface 340 communicates with the local switch controller 140 over a network, such as the Internet. Information indicating the ports of the local network that will be used to establish the requested video connection are transmitted to the local switch controller 140. The local switch controller interface 340 may receive information back from the local switch controller 140. For example, information about faults in the local network may be communicated to the network controller 120. The local switch controller interface 340 may receive this information, and provide the information to the router manager 320, which may store the information as part of the status information 370 in a storage device.

In some embodiments, after a video connection is reserved and/or after a video connection is established between two ports and the video connection is active, the route manager 320 may determine if an end time of the video connection is reached. When the end time, as specified in the end user's request, is reached the route manager 320 may send a command to the local switch controller 140 and/or to the long haul switch controller 130 indicating that the video connection should be terminated, disconnecting the source port from the destination port. In other embodiments, before an end time, as indicated by the end user's initial request, is reached, the end user may issue a "goodnight command". A goodnight command is a command indicating that the user wishes to immediately terminate the video connection and not wait for the end time to be reached. The goodnight command may be issued via the GUI of the computing device 104 and transmitted to the network controller 120, received by the web server interface 310 and provided to the route manager 320. Upon receiving the good night command, the route manager 320 may process the command and issue commands to the local switch controller 140 and/or to the long haul switch controller 130 indicating that the video connection should be terminated, disconnecting the source port from the destination port.

In some embodiments, after a video connection is reserved and/or after the video connection is established between two ports and the video connection is active, the end time may be modified. For example, the end time may be moved further out, lengthening the reserved time for the video connection, or moved back, shortening the reserved time for the video connection. In some embodiments, the ability to modify the end time may depend on the availability of the components required to provide the video connection for the extended period of time.

Figure 4:
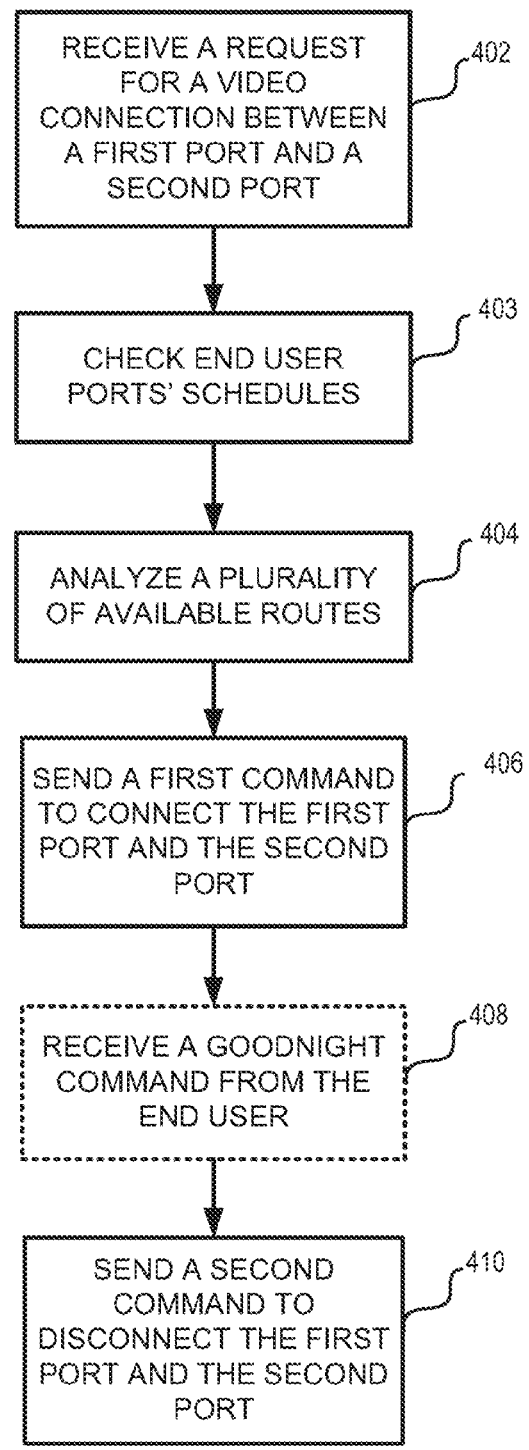
FIG. 4 is a schematic flow diagram of one embodiment for controlling a video network.

FIG. 4 illustrates a method 400 of controlling a video network according to some embodiments. In some embodiments, the method 400 may be performed by network controller 120. However, embodiments are not so limited and any suitable device may implement method 400.

At act 402, a request for a video connection between a first port and a second port is received. The request may be formatted in any suitable way and may include any suitable information. For example, the request may be formatted using XML and contain information indicating a start time, a stop time, a source city, a source port, a destination city, a destination port and/or a quality of service. In some embodiments, the request may not include a start time, but, rather, indicate that the video connection is being requested for immediate use.

At act 403, the end user schedules for the source port and the destination port is checked for availability. If one or both of the ports is unavailable during the requested time period, then then an indication may be sent to the end user's computing device 104 informing the end user 102 that the request end user ports are not available. At this point, the end user may choose to reschedule the video connection at a different time or, if the end user of the unavailable port owns more than one end user port, the end user 102 may request the video connection use a different end user port.

At act 404, a plurality of available routes are analyzed to determine at least one route. Any suitable analysis may be performed. As discussed above, in some embodiments route information, port information and status information may be used to determine which of the plurality of available routes is selected for creating the video connection. One embodiment of the analysis of the available routes is described in conjunction with FIG. 5 below.

In some embodiments, at any point after the route is determined and before the video connection is established, the end user may send a cancellation request to the network controller. This allows the end user versatility and control over each of the video connections that have been scheduled by the end user. For example, a video connection may be scheduled days or weeks in advance. If, at a later time, it is determined that the video connection is no longer needed, the video connection may be canceled.

At act 406, at least one first command is sent to create the video connection between the first port and the second port. The command may be sent, for example, to at least one switch controller, which may then control at least one switch to implement the video connection via the at least one selected route.

At act 410, at least one second command to disconnect the video connection is sent. In some embodiments, this command may be sent in response to determining that the indicated end time has been reached. In other embodiments, an optional goodnight command may be received from the end user at act 408. The goodnight command indicates that the video connection should be terminated immediately without waiting for the specified end time to be reached.

Figure 5:
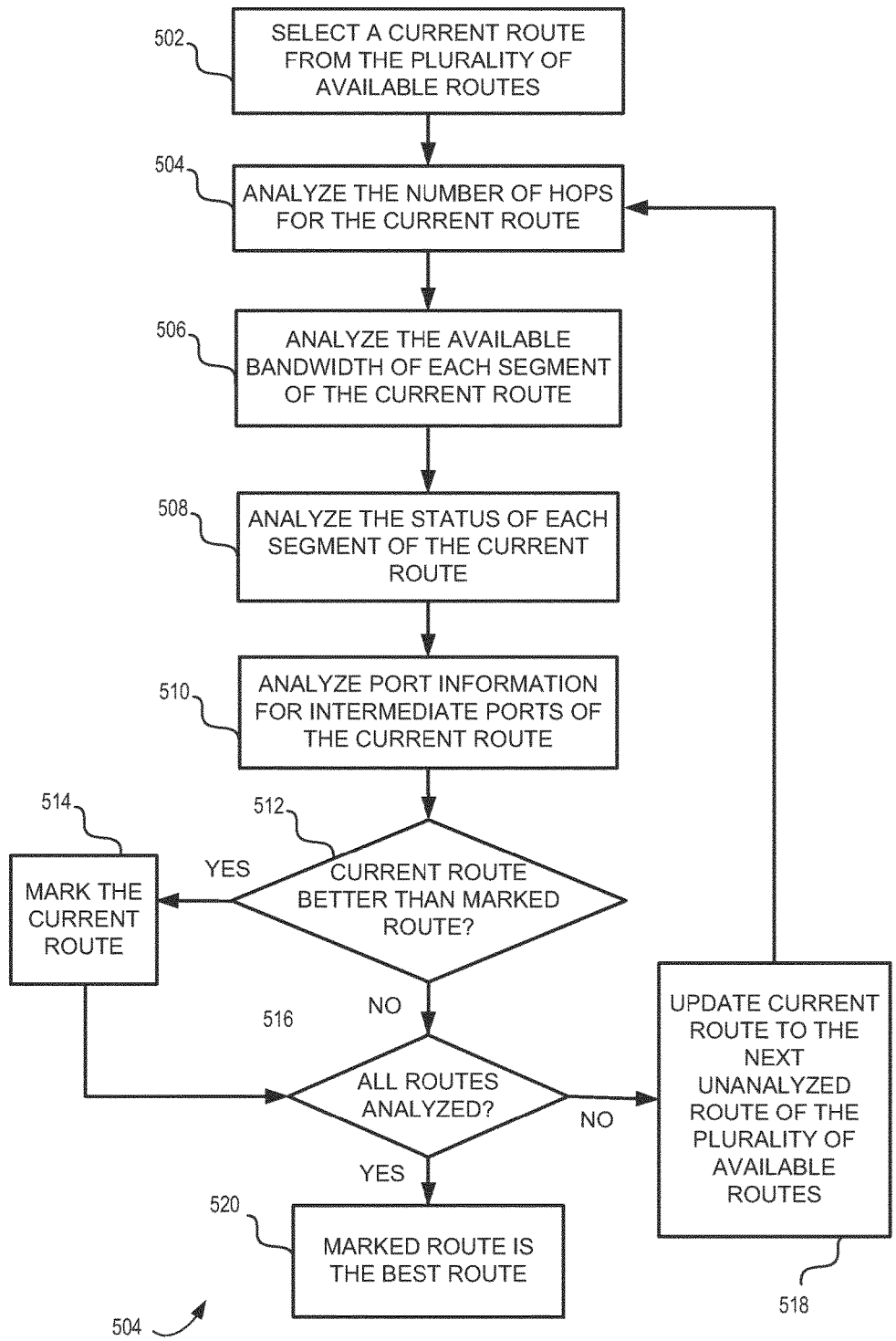
FIG. 5 is a schematic flow diagram of one embodiment for analyzing a plurality of available routes.

FIG. 5 illustrates a method 500 of analyzing a plurality of available routes according to some embodiments. Embodiments are not limited to this particular method of analyzing the plurality of available routes. Any suitable method may be used.

At act 502, a current route is selected form the plurality of available routes. In some embodiments, the plurality of available routes are stored in a database. The current route may be selected in any suitable way, such as selecting the route that appears first in the database.

At act 504, the number of hops for the current route is analyzed. Analysis of the number of hops may be done in any suitable way. For example, the number of intermediate nodes between the source port and the destination port may be counted.

At act 506, the available bandwidth of each segment of the current route may be analyzed. The available bandwidth may be analyzed in any suitable way. For example, for each segment of the current route, the total available bandwidth for a particular segment may be compared to the amount of bandwidth scheduled to be used between a start time and an end time of the current video connection request to ensure there is sufficient bandwidth to support the requested video connection.

At act 508, the status of each segment of the current route is analyzed. The status of segments of the current route may be analyzed in any suitable way. For example, it may be determined whether any segments of the current route are non-functional.

At act 510, port information for intermediate ports of the current route is analyzed. The port information may be analyzed in any suitable way. For example, it may be determined whether there are a sufficient number of ports available on an intermediate switch to support the requested video connection.

At act 512, it is determined whether the current route is better than a marked route. For the first time through this iterative method 500, there is no marked route, so the current route is selected as the marked route. During subsequent iterations, the current route is compared to the marked route to determine which route is better. This may be done in any suitable way. For example, if the current route has fewer hops than the marked route, the current route may be deemed better than the marked route. However, if the current route does not have sufficient bandwidth to support the requested video connection, then the current route may not be better than a marked route that does have sufficient bandwidth. The determination of which route is better may be based on a complex formula that weights the aforementioned analyzed parameters in different ways and compares the results for each route.

If it is determined at act 512 that the current route is better than the marked route, then the current route is marked at act 514 as the marked route and the previously marked route is unmarked.

After act 514, or if the current route is determined not to be better than the marked route, the method 500 continues to act 516 where it is determined whether all routes of the plurality of available routes have been analyzed. If no, the method 500 continues to act 518 where the current route is updated to be the next unanalyzed route of the plurality of available routes. The method 500 then loops back to act 504 to repeat the aforementioned analyses and determinations. If, at act 516, it is determined that all the routes of the plurality of available routes has been analyzed, the method 500 continues to act 520 where it is determined that the marked route is the best route. The best route may, for example, be selected as the primary route for the video connection.

Figure 6:
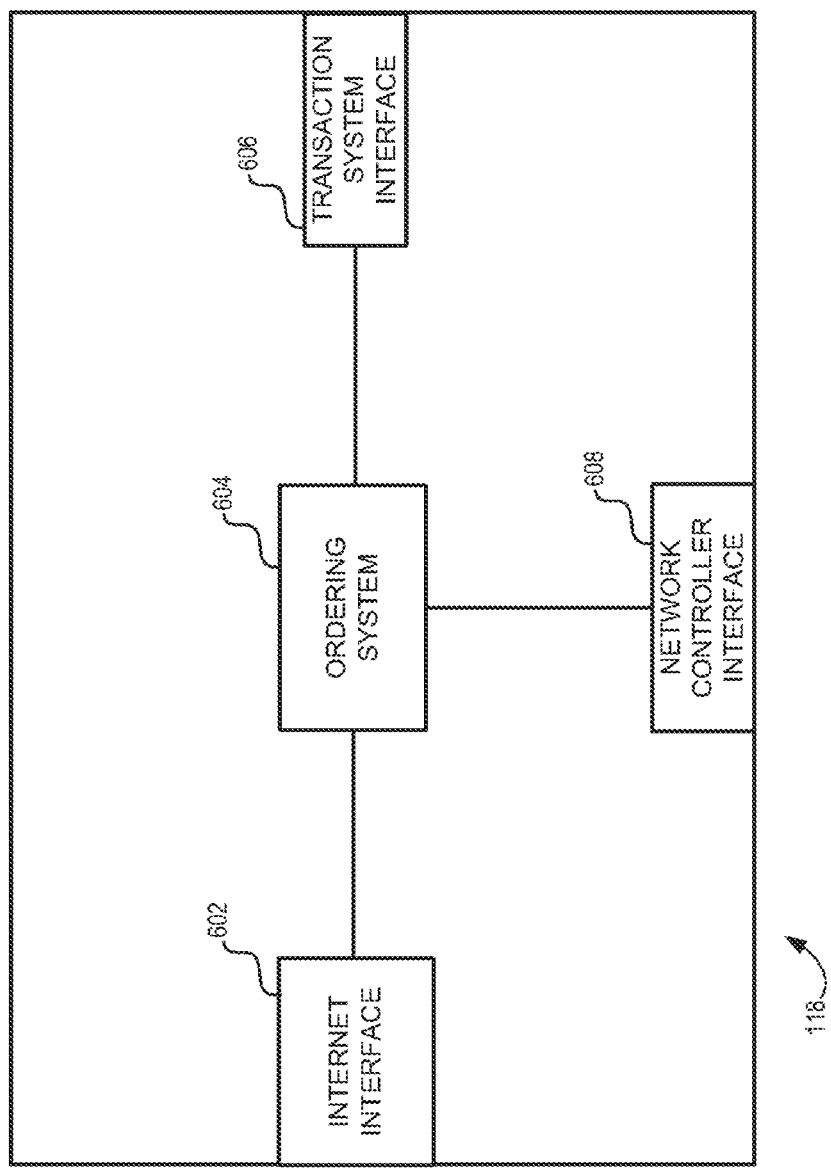
FIG. 6 is a simplified block diagram of a web server according to some embodiments.

FIG. 6 illustrates an exemplary web server 118 according to some embodiments. Any suitable hardware and/or software may be used to implement the web server 118. In some embodiments, more than one physical server may be used to implement web server 118.

In some embodiments, the web server 118 may include an internet interface 602, a transaction system interface 606 and a network controller interface 608. FIG. 6 illustrates each of these interfaces as separate interfaces. However, embodiments are not so limited. In some embodiments, a single interface may be used as the internet interface 602, the transaction system interface 606 and the network controller interface 608. In some embodiments, the interfaces may be any suitable network interface known in the art.

In some embodiments, the internet interface 602 connects the web server 118 to the Internet 110, allowing the web server 118 to communicate with end user 102 via computing device 104. In some embodiments, the internet interface 602 receives a request from the end user's computing device 104 for a video connection. The internet interface 310 may provide the request to an ordering system 604 for processing. In some embodiments, the internet interface 602 may transmit messages back to the end user's computing device 104 via the Internet 110. For example, if a request for a video connection fails, the end user 102 may be notified that the request failed. Any suitable messages may be sent from the network interface to the end user's computing device 104.

The ordering system 604 may be implemented by any suitable combination of hardware and/or software. In some embodiments, the ordering system 604 may verify that the end user is an authorized user associated with a customer of the video network service provider. In some embodiments, the ordering system 604 may also verify that the end user is communicating with the web server 118 using a computing device with a pre-registered IP address.

In some embodiments, the ordering system 604 may receive the end user's request for a video connection. Information from the request may be reformatted into a request that is sent to the network controller 120 via the network controller interface 608. In this way, the end user 102 and the end user's computing device 104 are shielded from the details of the network controller 120. The end user 102 may provide basic video connection request information via the GUI and the ordering system 604 may use this basic information, supplement the information with additional details needed to make a request to the network controller, and send a request to the network controller 120.

In some embodiments, the ordering system 604 may receive, in response to a request for a video connection, confirmation and denial information from the network controller 120. Confirmation and denial information, or a subset thereof, may be sent to the end user via internet interface 602. In some embodiments, additional information may also be received from the network controller with a denial request. For example, scheduling information for the requested end user ports may be received by the web server 118 and sent to the end user's computing device 104. The scheduling information may be presented to the end user to allow the user to request an alternative reservation in response to the denial of an initial request for a video connection.

In some embodiments, the ordering system 604 may send information related to scheduled and completed video connections to a transaction system 122 via transaction system interface 606. In some embodiments, video connection information such as start date/time, end date/time, duration, customer name, port information, quality of service information, route information, may be sent to the transaction system 122. In this way, transaction system 122 may automatically record and bill each video connection for each customer of the video network service provider.

Figure 7:
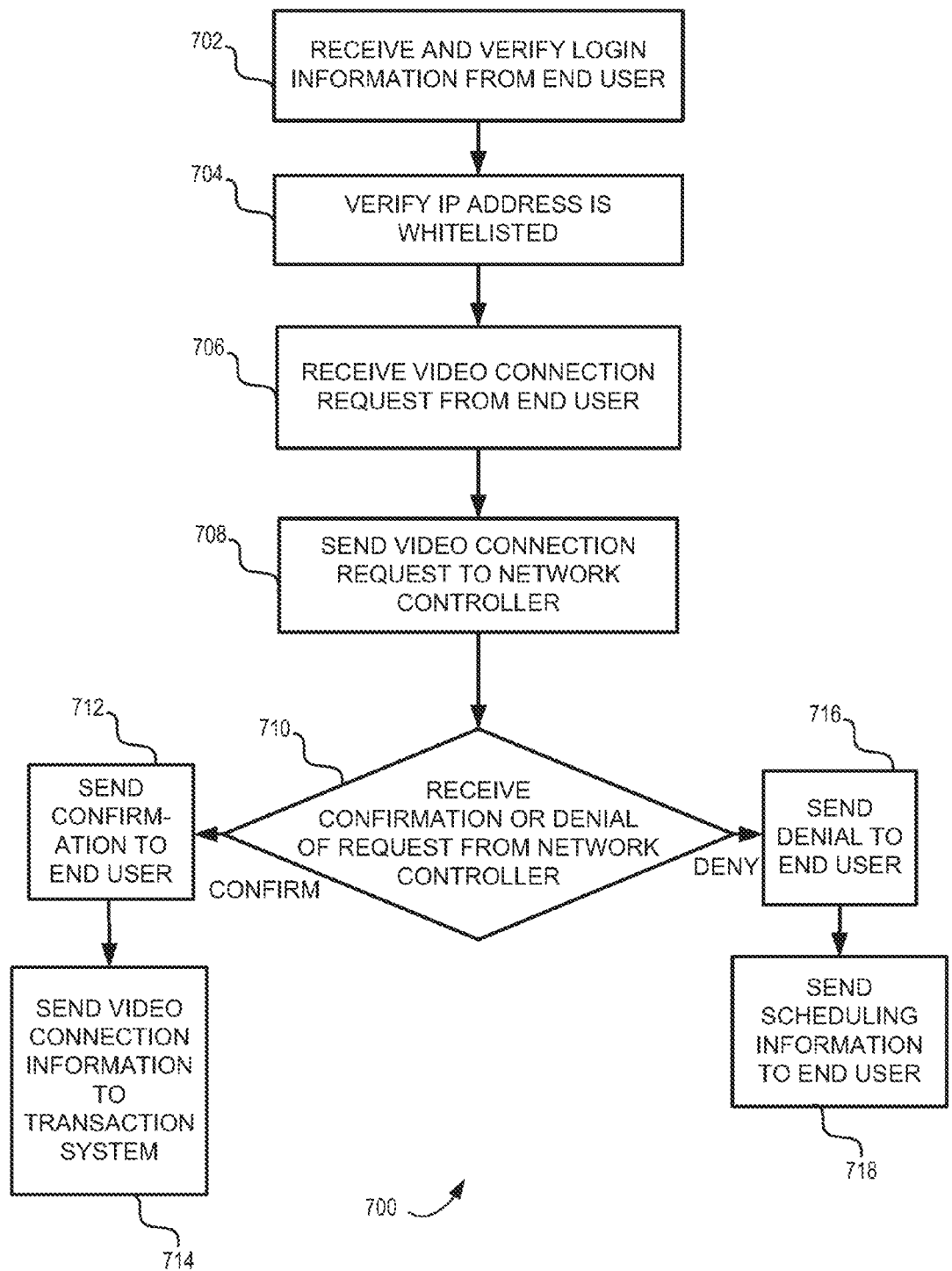
FIG. 7 is a schematic flow diagram of one embodiment for implementing a user-controlled video order and delivery system.

FIG. 7 illustrates a method 700 of implementing a customer-controlled ordering system according to some embodiments. In some embodiments, the method 700 may be performed by ordering system 604 of web server 118. However, embodiments are not so limited and any suitable device may implement method 700.

At act 702, login information from an end user is received and verified. In some embodiments, login information may include a username and password. A customer may have more than one end user with login information. Different end users may have different permission levels. In some embodiments, there may be one super-user associated with each customer. The super-user may have the ability to create new end user accounts and delete existing end user accounts. The super-user may also have the ability to modify login information for end users by, for example, resetting end user passwords. In this way, access to the video network may be largely administrated by the customer itself with little need for additional assistance from the video network service provider.

At act 704, an IP address of the end user's computing device 104 may be verified. In some embodiments, verification is achieved by checking that the IP address is on an IP whitelist. In some embodiments, each computing device that a customer wishes to use to control the video network may be pre-registered with the video network service provider. The IP whitelist provides the customer an additional level of security and control over its end users and which devices may be used to request video connections.

At act 706, a video connection request may be received from the end user 102. The request may comprise any suitable information. Information that may be included in a request may include, but is not limited to include: customer name, end user ID, source city, source port, destination city, destination port, start date, start time, end date, end time, quality of service, notes, and program name. This information may be provided by the end user 102 via the GUI of computing device 104.

At act 708, a video connection request may be sent to network controller 120. The video connection request may include some or all of the information received from the end user. The information may be reformatted to be in a specific format readable by the network controller.

At act 710, a confirmation or a denial of the video connection request is received from the network controller. If a confirmation is received at act 712, confirmation information is sent to the end user's computing device 104 to inform the end user that the request was successful. At act 714, video connection information may be sent to a transaction system for billing purposes. In some embodiments, video connection information may not be sent until after the requested video connection is used and the connection is terminated. In this way, the exact duration of the video connection may be billed to the customer.

If, at act 710, a denial of the request is received, denial information is sent to the end user's computing device 104 at act 712. At act 714, scheduling information for the requested source and destination end user ports may be sent to the end user's computing device to allow the end user to more easily reschedule the failed video connection.

Figure 8:
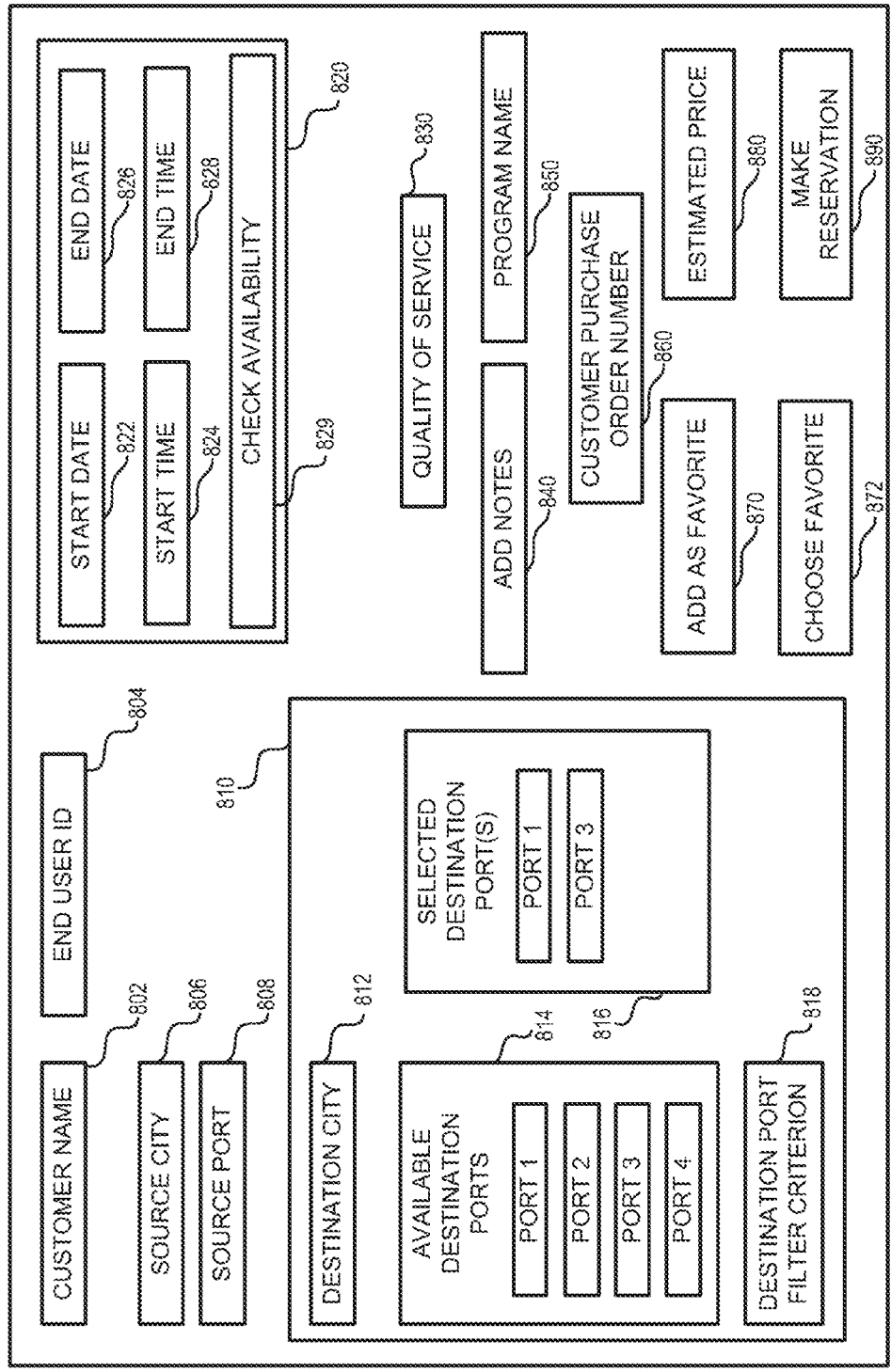
FIG. 8 illustrates a graphic user interface for allowing an end user to request a video connection according to some embodiments.

FIG. 8 illustrates a video connection reservation GUI 800 presented to the end user 102 via computing device 104, according to some embodiments. The video connection request GUI 800 may be presented to the end user 102 after logging in to the web server 118. In some embodiments, text fields or drop down menus may be used to allow the end user to select various parameters for the video connection. Some of the parameters may be immutable, in that they may be displayed for convenience, but cannot be changed by the end user. For example, a customer name 802 and end user ID 804 are displayed. These parameters may be immutable, as they are tied to the identity of the end user. The customer name 802 may be any suitable identifier, including, but not limited to a text string or an image associated with the customer. For example, if the customer is a television network, an icon representing the television network may be displayed. The end user ID may be the username used to login to the web server 118 or an actual name of the end user associated with the username.

In some embodiments, the GUI 800 may provide the end user options for selecting a source city 806 and source port 808. In some embodiments, the source city 806 and source port 808 options provided to the user may be limited to by the ports that are owned by the customer. Additionally, the source city 806 and source port 808 options may include options associated with any port of a different customer where the different customer has granted the customer access to a port for at least a temporary period of time. In some embodiments, the source city 806 and source port 808 options provided to the end user 102 may be limited by the permissions associated with the end user ID 804. For example, a particular end user may be limited to make reservations for certain source ports associated with the customer. In some embodiments, when an end user 102 selects a source city 806, the selection of source ports 808 available to choose from may be filtered based on the source city 806 selection. For example, if a customer has ports in Boston, Chicago and Los Angeles, and the end user selects Chicago as the source city 806, the source port 808 options provided to the user will only be the ports located in Chicago.

In some embodiments, the GUI 800 may provide the end user destination options 810. The destination options 810 displayed may include a destination city 812, available destination ports 814, selected destination ports 816 and a destination port filter criterion 818. Similar to the source city 806 option, the available destination ports 814 displayed to the end user 102 may be limited to the ports owned by the customer to which the end user is associated. Moreover, if the end user selects a particular destination city 812, the list of available destination ports 814 displayed to the user will be limited to the ports in the selected destination city 812. In some embodiments, additional filtering criterion 818 may also be applied by the end user 102. For example, end user 102 may search for a particular port based on a port name. When an end user 102 selects one or more destination ports from the available destination ports 814, information identifying the one or more destination ports is displayed indicating that the one or more destination ports are selected destination ports 816.

In some embodiments, the GUI 800 may provide the end user scheduling options 820. The scheduling options 820 displayed may include a start time 822, a start date 824, an end date 826, an end time 828 and a check availability option 829. In some embodiments, there may be an additional button (not shown) allowing the user to select the current time as the start time. This allows the end user to begin a video connection immediately, after verifying that the video network environment has the resources to support the requested video connection. Any suitable start date/time and end date/time may be selected. For example, end users may make video connection reservations for later the same day, later the same week or even months in advance.

In some embodiments, the check availability 829 option is provided to the end user 102. When this button is selected, a request may be sent to the web server 118 to check the availability of the selected source port 808 and destination port(s) 816 without sending an actual request for the video connection reservation. This option may allow an end user to determine if the desired end ports are available at the desired times prior to sending a reservation request. Using the check availability 829 button may be optional because if a video connection request is sent without checking the source/destination port availability and one or both of the ports are booked during the requested time, the computing device 104 may receive a denial of the request from the web server 118 resulting in the video connection request failing.

In some embodiments, the GUI 800 provides the end user 102 with a quality of service option 830. This may allow the end user to select whether the video connection should use uncompressed video data or compressed video data. In some embodiments, various compression options may be presented to the end user 102. For example, various frame rates and resolutions may be available to the end user. Also, different standards, such as the National Television System Committee (NTSC) standard and Phase Alternating Line (PAL) standard, may be provided as options to the user.

In some embodiments, the GUI 800 provides a notes field 840. The end user 102 may use this field for any purpose. For example, if one end user associated with the customer is making a video connection reservation, but a different end user associated with the customer will be monitoring the video connection while it is active, the first end user may leave instructions for the second end user about the purpose of the connection. Similarly, a program name field 850 may be provided. For example, if the video connection is associated with the video feed associated with the Oscars awards program, the end user 102 may enter "The Oscars" as the program name. This program name may be used by the customer to easily identify the purpose of the video connection. It may also be used on the customer's invoice, which may be automatically prepared by the video network service provider's transaction system 122. Also for billing purposes, the end user 102 may enter a customer purchase order number 860 for identification of each requested video connection.

In some embodiments, the GUI 800 may provide an option to "add as favorite" 870. This option may be used for re-occurring video connection. For example, if a weekly video connection is needed for a particular program between the same ports at the same time with the same quality of service, an end user may add the connection as a favorite. Then, when the end user wants to make a reservation for the program at a later time, the choose favorite 872 menu may be used to easily select the desired video connection.

In some embodiments, the GUI 800 may display an estimated price 880. This information may be based on the location of the source and destination ports and the duration of time being requested for the video connection. The estimated price 880 may be displayed prior to submitting the video connection request and may automatically update each time the end user 102 updates a field of the GUI 800.

The GUI 800 may also include a button 890 for making the reservation. Once the parameters for the video connection are input by the end user 102, the request to reserve the video connection is sent to the web server 118 upon selecting the "make reservation" button 890.

Figure 9:
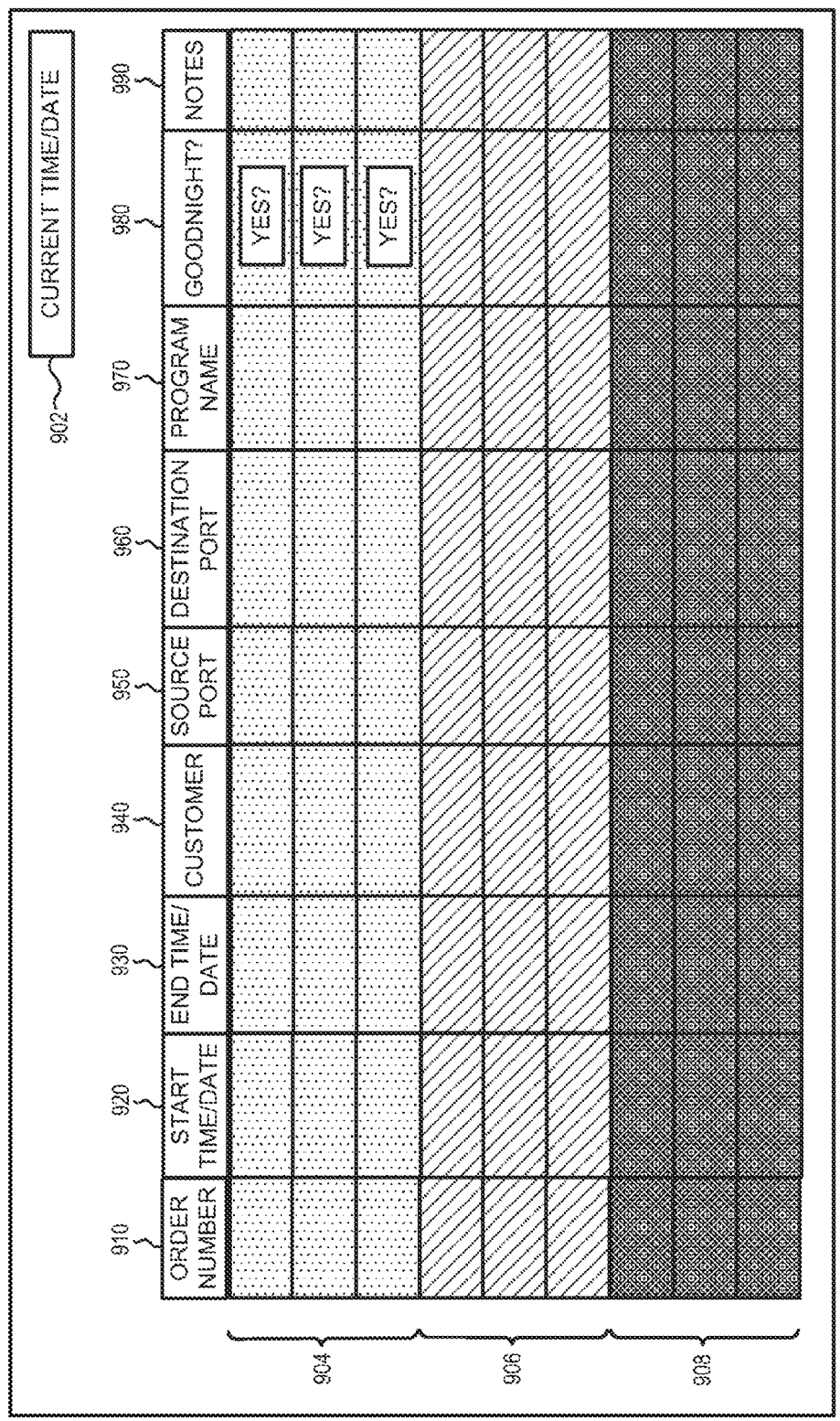
FIG. 9 illustrates a graphic user interface illustrating a reservation status screen according to some embodiments.

FIG. 9 illustrates a status screen GUI 900 presented to the end user 102 via computing device 104, according to some embodiments. The status screen GUI 900 may display information about current, upcoming, and past video connections made by the end user 102 and/or the associated customer. The GUI 900 may display the current date and time 902 for reference to the end user 102.

In some embodiments, the status screen GUI 900 may be displayed as a grid where each row represents a separate video connection and each column represents a parameter associated with each video connection. In some embodiments, the columns may include, but are not limited to, the order number 910, the start time/date 920, the end time/date 930, the customer name 940, the source port 950, the destination port 960, the program name 970, a good night option 980 and the notes 990. The parameters displayed for each respective video connection may correspond to the values entered by the end user 102 into the video connection reservation GUI 800 when the respective video connection was requested. In some embodiments, the source port 950 and destination port 960 may also include an identification of the source city and destination city, respectively.

In some embodiments, a goodnight option is provided for currently active video connections. For example, in FIG. 9, the first three rows 904 represent currently active video connections. If a user selects the goodnight option for these connections, the video connection may be terminated prior to the scheduled end time.

In some embodiments, the rows of the status screen GUI 900 may be color-coded to indicate whether a video connection is currently active, a reservation for a video connection in the near future, a reservation for a video connection in the distant future, or a video connection that was previously active but are already completed (not shown). For example, currently active video connections 904 may be highlighted in a green color, video connections reserved in the near future 906 may be highlighted blue and video connections reserved in the distant future 908 may be highlighted yellow. Any suitable duration of time may be used to distinguish near future and distant future reservations. For example, in some embodiments, near future reservations are reservations that begin within 24 hours of the current time and distant future reservations are reservations that begin more than 24 hours from the current time. In some embodiments, reservations that are about to become active may be further highlighted with a flashing highlighted color. For example, a video connection that is scheduled to start within 15 minutes may flash green. Embodiments are not limited to any particular highlighting colors or time durations for distinguishing near future and distant future reservations.

In some embodiments, video connection reservations may be canceled from the status screen GUI 900. For example, the end user 102 may select one of the displayed video connections (e.g., a row in FIG. 9) and choose to cancel the reservation. Alternatively, the end user 102 may choose to modify the reservation. For example, the end user may modify the start time, end time, order number, program name and/or note of a reserved video connection prior to the video connection becoming active. Once active, the end time, order number, program name and/or note may be modified prior to the end of the video connection.

Figure 10:
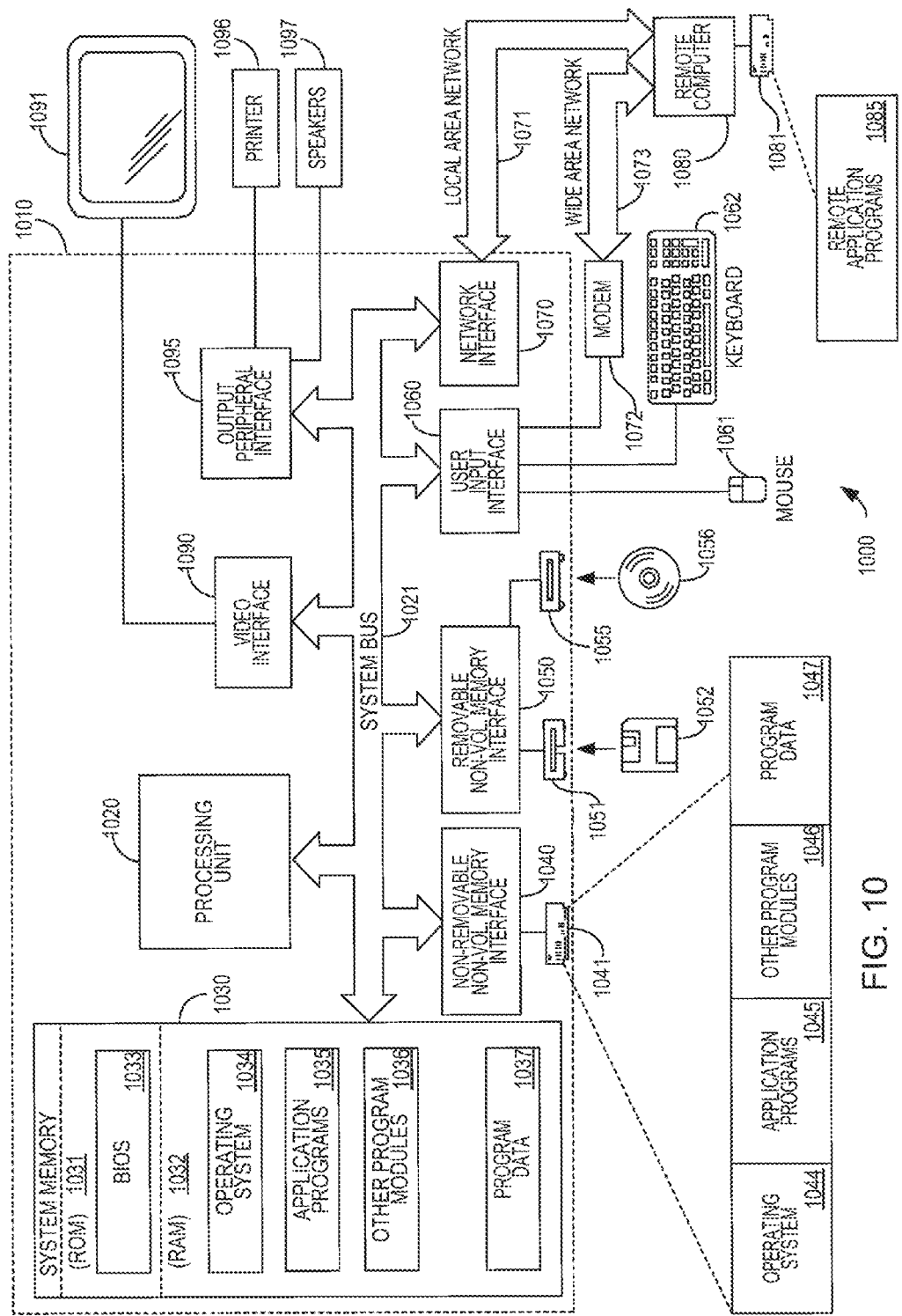
FIG. 10 is a block diagram of an exemplary computing environment in which embodiments of the invention may operate.

FIG. 10 illustrates an example of a suitable computing system environment 1000 on which the embodiments may be implemented. For example, the end user's computing device 104, web server 118, network controller 120, transaction system 122, long haul switch controller 130 and local switch controller 140 may all be implemented using a computing system environment 1000 or a variation therefrom.

The computing system environment 1000 is only one example of a suitable computing environment and is not intended to suggest any limitation as to the scope of use or functionality of the invention. Neither should the computing environment 1000 be interpreted as having any dependency or requirement relating to any one or combination of components illustrated in the exemplary operating environment 1000.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 10, an exemplary system for implementing the invention includes a general purpose computing device in the form of a computer 1010. Components of computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1010. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036, and program data 1037.

The computer 1010 may also include other removable/non-removable, volatile/nonvolatile computer storage media. By way of example only, FIG. 10 illustrates a hard disk drive 1041 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through an non-removable memory interface such as interface 1040, and magnetic disk drive 1051 and optical disk drive 1055 are typically connected to the system bus 1021 by a removable memory interface, such as interface 1050.

The drives and their associated computer storage media discussed above and illustrated in FIG. 10, provide storage of computer readable instructions, data structures, program modules and other data for the computer 1010. In FIG. 10, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies. A user may enter commands and information into the computer 1010 through input devices such as a keyboard 1062 and pointing device 1061, commonly referred to as a mouse, trackball or touch pad. Other input devices (not shown) may include a microphone, joystick, game pad, satellite dish, scanner, or the like. These and other input devices are often connected to the processing unit 1020 through a user input interface 1060 that is coupled to the system bus, but may be connected by other interface and bus structures, such as a parallel port, game port or a universal serial bus (USB). A monitor 1091 or other type of display device is also connected to the system bus 1021 via an interface, such as a video interface 1090. In addition to the monitor, computers may also include other peripheral output devices such as speakers 1097 and printer 1096, which may be connected through a output peripheral interface 1095.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 10 illustrates remote application programs 1085 as residing on memory device 1081. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

For example, in FIG. 4 the method 400 illustrates that a plurality of available routes is analyzed after receiving a request for a video connection. In alternative embodiments, the analysis may be done ahead of time and stored in a memory such that the at least one route for forming the video connection is pre-selected.

Also, by giving customers control of the video network, customer may also control who has access to their content. For example, a first customer may allow other customers to access video content being provided by the first customer's port by sending a "Permission Granted To Add" (PGAD) request to the network controller 120. By granting access to a port to one or more other customers, for a limited or unlimited amount of time, the first customer can share content with other users that the first customer desires to share, while maintaining the privacy of other content. For example, if the first customer is broadcasting a television charity event and wants to provide that video feed to anyone who wants to use it, the first customer could send a PGAD request to network controller indicating that between a start time and an end time, any other customer of the video network service provider may access and use the video content on a particular port. The other customers may then be provided a visual indication on their own GUI on their own computing device that there is a video feed available for them to use, if they so choose. They may then create a video connection to the shared port by selecting the shared port as the source port.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computer-controlled method for controlling a video network, the method comprising:
receiving a request from an end user for a video connection between a first port and a second port, wherein the request specifies at least a start time, an end time, the first port, the second port, and a requested video quality of service for the video connection;
analyzing, using at least one processor, a plurality of available routes between the first port and the second port to determine a primary route and at least one secondary route that will be used to connect the first port and the second port, wherein the at least one secondary route will only be used for a video connection by the end user if the primary route fails, wherein analyzing the plurality of available routes comprises analyzing, for each route of a plurality of routes of the video network between the first port and the second port, available video quality of service capabilities of the route during a time between the start time and the end time to identify whether the route is capable of providing the requested quality of service during the time; and automatically sending, to at least one switch controller, a first command to connect the first port and the second port via the primary route at the start time.

2. The computer-controlled method of claim 1, further comprising:
sending, to the at least one switch controller, a second command to disconnect the first port and the second port via the primary route at the end time.

3. The computer-controlled method of claim 1, further comprising:
receiving a goodnight command from the end user at a time before the end time; and
in response to the goodnight command, sending, to the at least one switch controller, a second command to disconnect the first port and the second port at the time before the end time.

4. The computer-controlled method of claim 1, wherein the first port is in a first city and the second port is in a second city other than the first city.

5. The computer-controlled method of claim 1, wherein the request further specifies that the first port is a source port and the second port is a destination port.

6. The computer-controlled method of claim 5, wherein:
the end user is an owner of the destination port; and
access to the source port was explicitly granted by an owner of the source port.

7. The computer-controlled method of claim 1, wherein analyzing the plurality of available routes between the first port and the second port comprises:
determining the primary route and the at least one secondary route based on a number of hops between the first port and the second port for each of the plurality of available routes.

8. The computer-controlled method of claim 1, wherein analyzing the plurality of available routes between the first port and the second port comprises:
determining the primary route and the at least one secondary route based on available bandwidth between the first port and the second port for each of the plurality of available routes.

9. The computer-controlled method of claim 8, wherein analyzing the plurality of available routes between the first port and the second port comprises:
determining available bandwidth for each of the plurality of available routes based on:
a total bandwidth of each segment of a respective available route; and
a used bandwidth of each segment of the respective available route, wherein the used bandwidth is an amount of bandwidth of the respective available route scheduled to be used by other video connections between the start time and the end time.

10. The computer-controlled method of claim 1, wherein analyzing the plurality of available routes between the first port and the second port comprises:
determining the primary route and the at least one secondary route based on information indicating that one or more segments of the plurality of available routes is unavailable, wherein an unavailable segment comprises a segment that cannot be used for the video connection during the time between the start time and the end time.

11. The computer-controlled method of claim 10, further comprising:
receiving the information indicating that the one or more segments of the plurality of available routes is unavailable.

12. The computer-controlled method of claim 1, wherein analyzing the plurality of available routes between the first port and the second port comprises:
determining the primary route and the at least one secondary route based on port information about at least one intermediate port of the plurality of available routes.

13. The computer-controlled method of claim 12, wherein the port information comprises a number of available ports on at least one switch of a route.

14. The computer-controlled method of claim 12, wherein the port information comprises capabilities of ports on at least one switch of a corresponding route.

15. The computer-controlled method of claim 1, wherein:
the video network is dedicated to local and inter-city transmission of video;
the video network comprises a plurality of communication lines interconnected by a plurality of local switches to convey video data within local areas and a plurality of long-haul switches to convey video between the local areas; and
analyzing the plurality of available routes comprises analyzing the plurality of available routes between the first port and the at least one second port via at least one of the plurality of communication lines and via at least one of the plurality of local switches and/or the plurality of long-haul switches.

16. The computer-controlled method of claim 15, wherein:
analyzing the available video quality of service for the plurality of routes comprises analyzing, for one or more switches of the plurality of local switches and/or the plurality of long-haul switches, available video quality of service capabilities of each of the one or more switches during a time between the start time and the end time to identify whether the switch is capable of providing the requested quality of service during the time.

17. The computer-controlled method of claim 16, wherein:
analyzing the available video quality of service capabilities of each of the one or more switches comprises:
analyzing video quality of service capabilities of individual ports of the one or more switches, and
determining, for the individual ports, which of the individual ports are available during the time; and
determining the primary route and the at least one secondary route comprises determining routes each including one or more communication lines connecting ports of switches that are available to provide the requested video quality of service during the time.

18. The computer-controlled method of claim 17, wherein:
at least a first switch of the one or more switches includes a plurality of ports and there is variation in video quality of service capabilities of ports of the plurality of ports of the first switch, and
analyzing the available quality of service capabilities of the first switch comprises:
identifying one or more ports of the plurality of ports of the first switch that are adapted to provide the requested video quality of service, and
determining whether a port of the identified one or more ports is available to provide the requested video quality of service during the time.

19. The computer-controlled method of claim 18, wherein:
the requested video quality of service of the request comprises an indication of whether video compression is to be used to transmit video over the video connection and, if so, at least one type of video compression;
the video quality of service capabilities of a port of a switch comprise whether video compression is supported on the port and, if so, which one or more types of video compression are supported; and
determining whether a port of the identified one or more ports is available to provide the requested video quality of service during the time comprises:
determining whether the port is available during the time;
in a case that the requested video quality of service indicates that video compression is not to be used, determining whether the port supports uncompressed video; and
in a case that the requested video quality of service indicates that video compression is to be used, determining whether the port supports one or more of the at least one type of video compression identified in the requested video quality of service.

20. The computer-controlled method of claim 19, further comprising:
storing information indicating that switches and/or ports of the primary route and the at least one secondary route are reserved for the video connection during the time between the start time and the end time.

21. The computer-controlled method of claim 15, wherein:
the primary route comprises a first plurality of segments and the at least one secondary route comprises a second plurality of segments, wherein each segment of the first and second plurality of segments comprises a communication line and/or at least one switch of the plurality of local switches and/or the plurality of long-haul switches; and
determining the primary route and the at least one secondary route comprises determining the primary route and the at least one secondary route such that there is no overlap between the first plurality of segments and the second plurality of segments.

22. The computer-controlled method of claim 1, wherein analyzing the plurality of available routes comprises:
identifying, from the plurality of available routes, one or more qualifying routes that meet one or more criteria for use for the video connection, the one or more criteria comprising a criterion that a route be able to provide the requested video quality of service during the time;
selecting, as one of the at least one secondary route, a route from the one or more qualifying routes that has a fewest number of hops of the one or more qualifying routes such that the one of the at least one secondary route has a fewer number of hops than the primary route.

23. The computer-controlled method of claim 1, wherein analyzing the plurality of available routes comprises:
identifying, from the plurality of available routes, one or more qualifying routes that meet one or more criteria for use for the video connection, the one or more criteria comprising a criterion that a route be able to provide the requested video quality of service during the time; and
selecting, as one of the at least one secondary route, a route from the one or more qualifying routes that has a fastest transmission time of the one or more qualifying routes such that the one of the at least one secondary route has a faster transmission time than the primary route.

24. The computer-controlled method of claim 1, wherein analyzing the plurality of available routes comprises:
identifying, from the plurality of available routes, one or more qualifying routes that meet one or more criteria for use for the video connection, the one or more criteria comprising a criterion that a route be able to provide the requested video quality of service during the time; and
selecting, as one of the at least one secondary route, a route from the one or more qualifying routes that is a shortest route of the one or more qualifying routes such that the one of the at least one secondary route is a shorter route than the primary route.

25. The computer-controlled method of claim 1, wherein:
analyzing the plurality of available routes comprises, in a case that the requested video quality of service indicates that uncompressed video is to be transmitted, determining whether an available route is capable of transmitting uncompressed video; and
determining whether an available route is capable of transmitting uncompressed video comprises determining, for each switch of one or more switches included in the available route, determining whether a port of the switch is both capable of transmitting uncompressed video and available to transmit uncompressed video during the time.

26. A video network controller comprising:
a storage device configured to store a catalog of routes and a schedule for connections between ports;
a network interface configured to receive a request from an end user for a video connection between a first port and a second port, wherein the request specifies at least a start time, an end time, the first port and the second port;
a route manager configured to analyze a plurality of available routes between the first port and the second port to determine a primary route and at least one secondary route that will be used to connect the first port and the second port, wherein the at least one secondary route will only be used for a video connection by the end user if the primary route fails; and
at least one switch controller interface configured to send, to at least one switch controller, a first command to connect the first port and the second port via the primary route at the start time.

27. The video network controller of claim 26, wherein the at least one switch controller interface is further configured to send, to the at least one switch controller, a second command to disconnect the first port and the second port via the primary route at the end time.

28. The video network controller of claim 26, wherein:
the network interface is further configured to receive a goodnight command from the end user at a time before the end time; and
the at least one switch controller interface is further configured to, in response to the goodnight command, send, to the at least one switch controller, a second command to disconnect the first port and the second port at the time before the end time.

29. The video network controller of claim 26, wherein the primary route comprises a first plurality of segments and the secondary route comprises a second plurality of segments, wherein there is no overlap between the first plurality of segments and the second plurality of segments.

30. At least one non-transitory computer readable medium encoded with computer executable instruction that, when executed by a computer, perform a method for controlling a network, the method comprising:

receiving a request from an end user for a connection between a first port and a second port, wherein the request specifies at least a start time, an end time, the first port and the second port;

analyzing, using at least one processor, a plurality of available routes between the first port and the second port to determine a primary route and at least one secondary route that will be used to connect the first port and the second port, wherein the at least one secondary route will only be used for a connection by the end user if the primary route fails; and automatically sending, to at least one switch controller, a first command to connect the first port and the second port via the primary route at the start time.

* * * * *